United States Patent
Dabral et al.

(10) Patent No.: US 6,278,312 B1
(45) Date of Patent: Aug. 21, 2001

(54) METHOD AND APPARATUS FOR GENERATING A REFERENCE VOLTAGE SIGNAL DERIVED FROM COMPLEMENTARY SIGNALS

(75) Inventors: Sanjay Dabral, Milpitas; Ming Zeng, San Jose, both of CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/256,843

(22) Filed: Feb. 24, 1999

(51) Int. Cl.[7] .................................................. H03L 5/08
(52) U.S. Cl. ........................ 327/310; 327/180; 327/551
(58) Field of Search ................................ 327/72, 73, 180, 327/310, 551

(56) References Cited

U.S. PATENT DOCUMENTS

| | | | |
|---|---|---|---|
| 4,588,905 | * 5/1986 | Kojima | 327/166 |
| 4,631,737 | * 12/1986 | Davis et al. | 327/309 |
| 5,574,634 | * 11/1996 | Parlour et al. | 363/59 |
| 5,760,648 | * 6/1998 | Koifman et al. | 327/361 |
| 5,856,750 | * 1/1999 | Koseki | 327/72 |
| 5,973,515 | * 10/1999 | Marbot et al. | 327/65 |
| 6,037,824 | * 3/2000 | Takahashi | 327/337 |

* cited by examiner

Primary Examiner—Terry D. Cunningham
(74) Attorney, Agent, or Firm—Peter Lam

(57) ABSTRACT

A driver circuit and a receiver circuit. The driver circuit is coupled to drive two complementary signals and the receiver is coupled to receive the two complementary signals. The receiver circuit generates a reference voltage from the two complementary signals.

19 Claims, 7 Drawing Sheets

METHOD AND APPARATUS FOR GENERATING A REFERENCE VOLTAGE SIGNAL DERIVED FROM COMPLEMENTARY SIGNALS

BACKGROUND

1. Field of the Disclosure

The present disclosure pertains to the field of signal transmission. More particularly, the present disclosure pertains to deriving a reference voltage from two complementary signals and, in some embodiments, the use of such a reference voltage in facilitating the transmission and reception of signals between two circuits.

2. Description of Related Art

As integrated circuits and other electronic components are continually improved, data transfer rates between such components typically increase. One significant problem with transmitting signals between components at faster rates is that signal noise tends to obscure the underlying signal. Improved techniques to contend with signal noise may advantageously allow faster inter or intra-component signaling or more efficient signal drivers and/or receivers.

One noise component associated with switching of large or numerous driver circuits is caused by the large amount of current drawn when such drivers switch. Additionally, the normal operation of a component can introduce noise to the power supply of the component. Any such noise may affect the quality of signals transmitted to other components.

One prior art technique for transmitting signals is shown in FIG. 1. A driver block 100 includes a reference voltage generator 102 formed by a resistor 110 and a resistor 105 coupled together in a voltage divider arrangement between the supply voltage (Vcc) and ground of the driver block 100. As a result, a reference voltage (Vref), which reflects noise in the Vcc and ground rails of the driver block 100, is provided on a signal line 130 (see also, e.g., "A 900 Mb/s Bidirectional Signaling Scheme," IEEE *Journal of Solid-State Circuits*, Vol. 30, No. 12, December 1995). The driver block 100 also includes a signal driver 115 which drives a data signal on a signal line 135, and a clock driver 140 that drives a clock signal on a signal line 142 in conjunction with or synchronized with the data signal.

A receiver block 150 includes an input circuit 160, such as a differential sense amplifier, which is coupled to receive both the data signal and the reference voltage. The input circuit 160 substantially subtracts or cancels common mode noise (noise from common sources coupled in both signals and the reference voltage), thereby obtaining a cleaner data signal at node 165. Both noise from the driver and noise introduced by interconnect may be coupled in the reference voltage and the data signal. Therefore, such noise may be reduced or eliminated from the data signal using the common mode reference voltage. This type of arrangement is known as a psuedo-differential technique because it uses only signal(s) and a reference voltage rather than two complementary signals as used in a differential scheme. The output of the input circuit 160 is latched by a latch 170 clocked by the clock signal from the clock driver 140.

Unfortunately, this technique requires a dedicated signal line and input and output interfaces (e.g., pins or connector balls in the case of integrated circuits), often raising the cost of the system. Additionally, older systems typically do not have a dedicated reference voltage line, and compatibility may restrict introduction of a new dedicated interface. Therefore, the need for additional pins is a disadvantage of this prior art approach.

SUMMARY

A disclosed apparatus includes a driver circuit and a receiver circuit. The driver circuit is coupled to drive two complementary signals and the receiver is coupled to receive the two complementary signals. The receiver circuit generates a reference voltage from the two complementary signals.

BRIEF DESCRIPTION OF THE FIGURES

The present invention is illustrated by way of example and not limitation in the figures of the accompanying drawings.

DETAILED DESCRIPTION

The following description provides a method and apparatus for generating a 5 reference voltage signal derived from complementary signals. In the following description, numerous specific details such as resistor types, capacitor types, signal names and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

According to disclosed techniques, improved signaling may be provided between various components or portions thereof. Both noise from ground bounce caused by the simultaneous switching of numerous signal line drivers and board and interconnect noise may be eliminated or at least reduced by transmitting a reference voltage from a driving circuit to the receiving circuit. Such improved signaling may allow faster or lower voltage data transfer between components. Some disclosed techniques may advantageously reduce the overhead of transmitting a reference voltage between components by utilizing pre-existing complementary signals to derive a reference voltage at the receiver. Such embodiments may advantageously reduce interface signals and routing between components. Additionally, some embodiments may provide a voltage reference circuit that can be disabled at certain times to reduce power consumption.

Figure 2A:
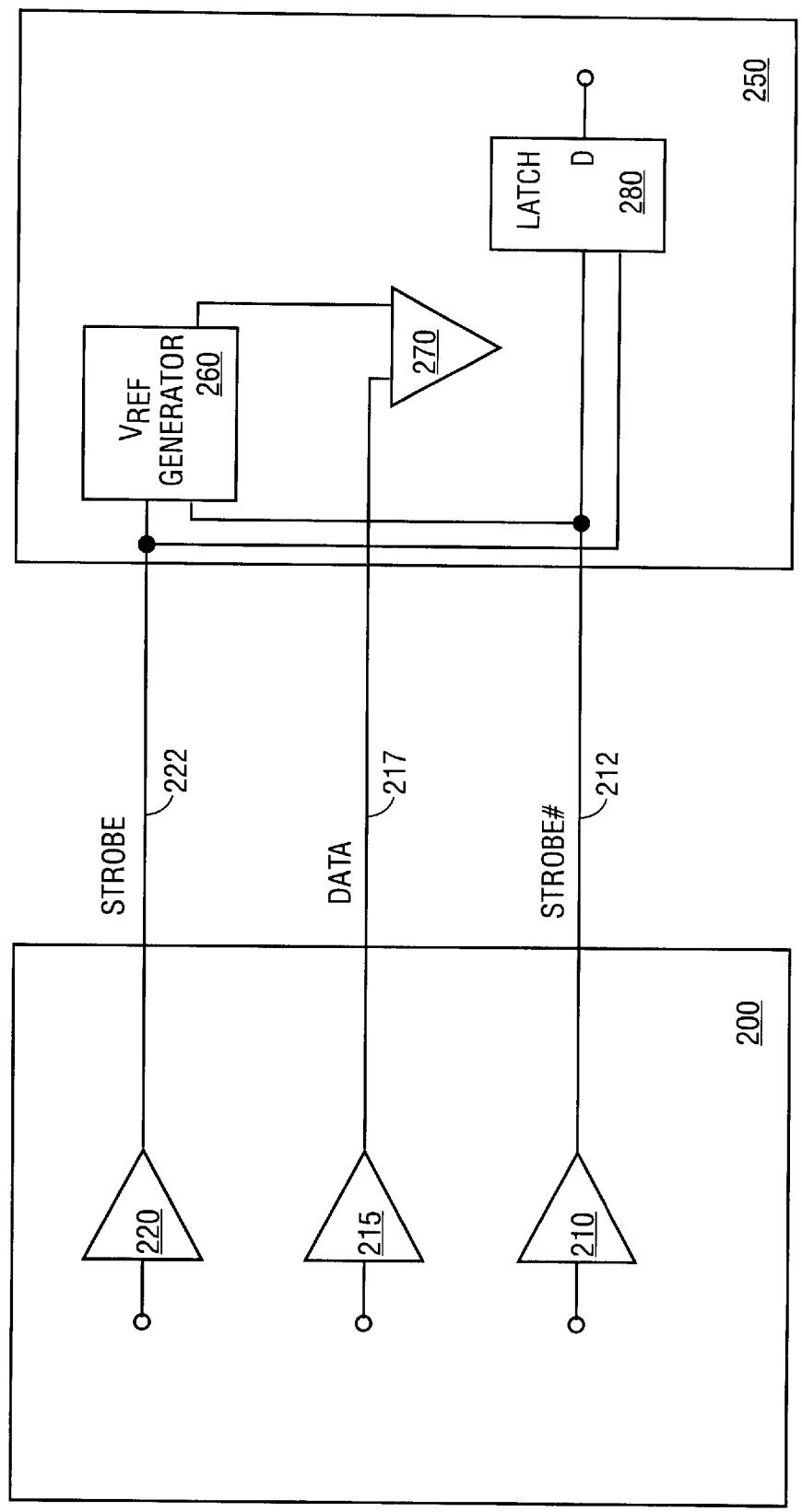
FIG. 2A illustrates one embodiment of driver and receiver circuits that generate and utilize a reference voltage signal according to disclosed techniques.

In the system illustrated in FIG. 2A, a driver block 200 and a receiver block 250 communicate using a source synchronous protocol. The driver block 200 includes a strobe driver 220 and a complementary strobe driver 210 which drive respectively a strobe signal and a strobe# signal (the complement of the strobe signal) on signal lines 222 and 212. The driver block 200 also includes a data driver 215 that drives a data signal on a data line 217. Control logic (not shown) ensures that the data and the two strobe signals are driven simultaneously or at least approximately simultaneously.

The receiver block 250 includes a reference voltage generator 260 that is coupled to receive both the strobe and strobe# signals. From these two complementary signals, the reference voltage generator 260 effectively cancels the complementary signal portions and provides the remaining voltage as a reference voltage. For traditional complementary metal oxide semiconductor (CMOS) signal levels, complementary signals are at opposite voltage levels. If the complementary signals are symmetric, the reference voltage remains at one-half the supply voltage (Vcc). Different known or otherwise available arrangements that effectively cancel the signal portions of two complementary signals may be used.

Since the signal portions cancel for complementary signals, the reference voltage reflects the noise at the source of the strobe and strobe# signals. In some embodiments, the strobe and strobe# signals are generated close to the data signal, or even in the center of a group of data signal drivers, and therefore the reference voltage communicates the noise also present in the data signal.

The receiver circuit includes a sense amplifier, sense amp 270, which is coupled to receive the data signal and the reference voltage from the reference voltage generator 260. The sense amp 270 subtracts the reference voltage from the data signal, thereby effectively canceling or at least partially removing common mode noise present in both signals. Any appropriate known or otherwise available sense amplifier such as a differential sense amplifier, or a voltage subtraction circuit, or other input circuit to accomplish this purpose may be used. It may be advantageous to use a sense amplifier with a high common mode rejection ratio (CMRR) to provide increased noise cancellation. Such sense amp circuits are known in the art. In the illustrated embodiment, the data signal output from the sense amp 270 is latched by a latch 280 using one or both of the strobe signals.

Since the reference voltage is generated by strobe signals that are already being transmitted between the driver block 200 and the receiver block 250, additional interface signals are not needed to implement noise cancellation using a reference voltage generator according to a disclosed technique. This may advantageously reduce costs in some embodiments since additional interfaces such as pins on an integrated circuit typically increase the cost of the packaged part.

Figure 2B:
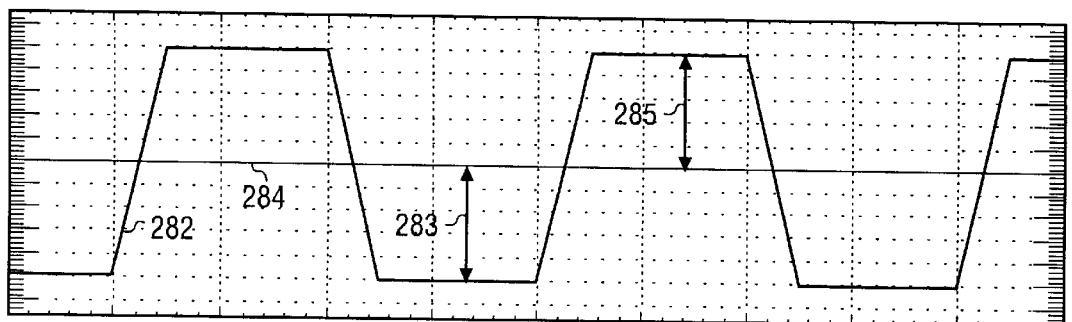
FIGS. 2B–2E illustrate waveforms contrasting operation of one embodiment utilizing a reference voltage according to disclosed techniques to the operation of ideal and prior art systems.

FIGS. 2B–2E illustrate waveforms contrasting operation of one embodiment utilizing a reference voltage according to disclosed techniques to the operation of ideal and prior art systems. In FIG. 2B, an ideal data signal 282 and an ideal reference voltage 284 are shown. In this ideal case, the noise margin for high signal levels 285 and the noise margin for low signal levels 283 are maximized because the reference voltage 284 is half way between the high and low voltage points of the data signal 282.

Figure 2C:
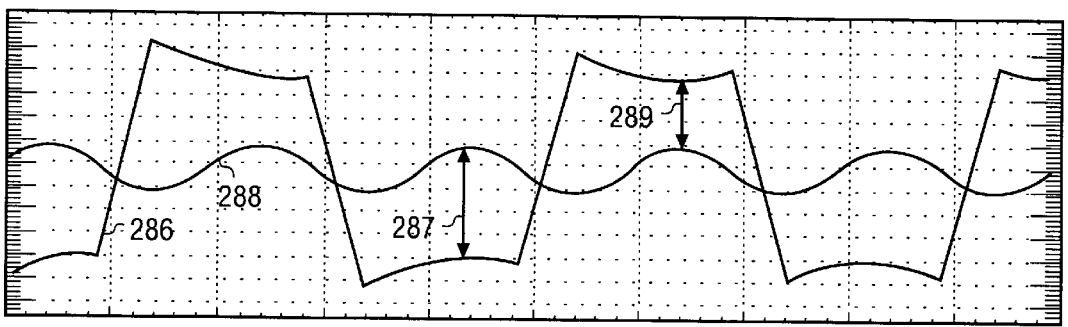

FIG. 2C illustrates a case in which noise in the data signal 286 and in the reference voltage 288 are uncorrelated. At some times, the noise margin may be relatively large (e.g., at point 287), and at others times the noise margin may be relatively small (e.g., at point 289). Since the noise in the reference voltage and the data signal are uncorrelated, the use of a reference voltage is not as beneficial.

Figure 1:
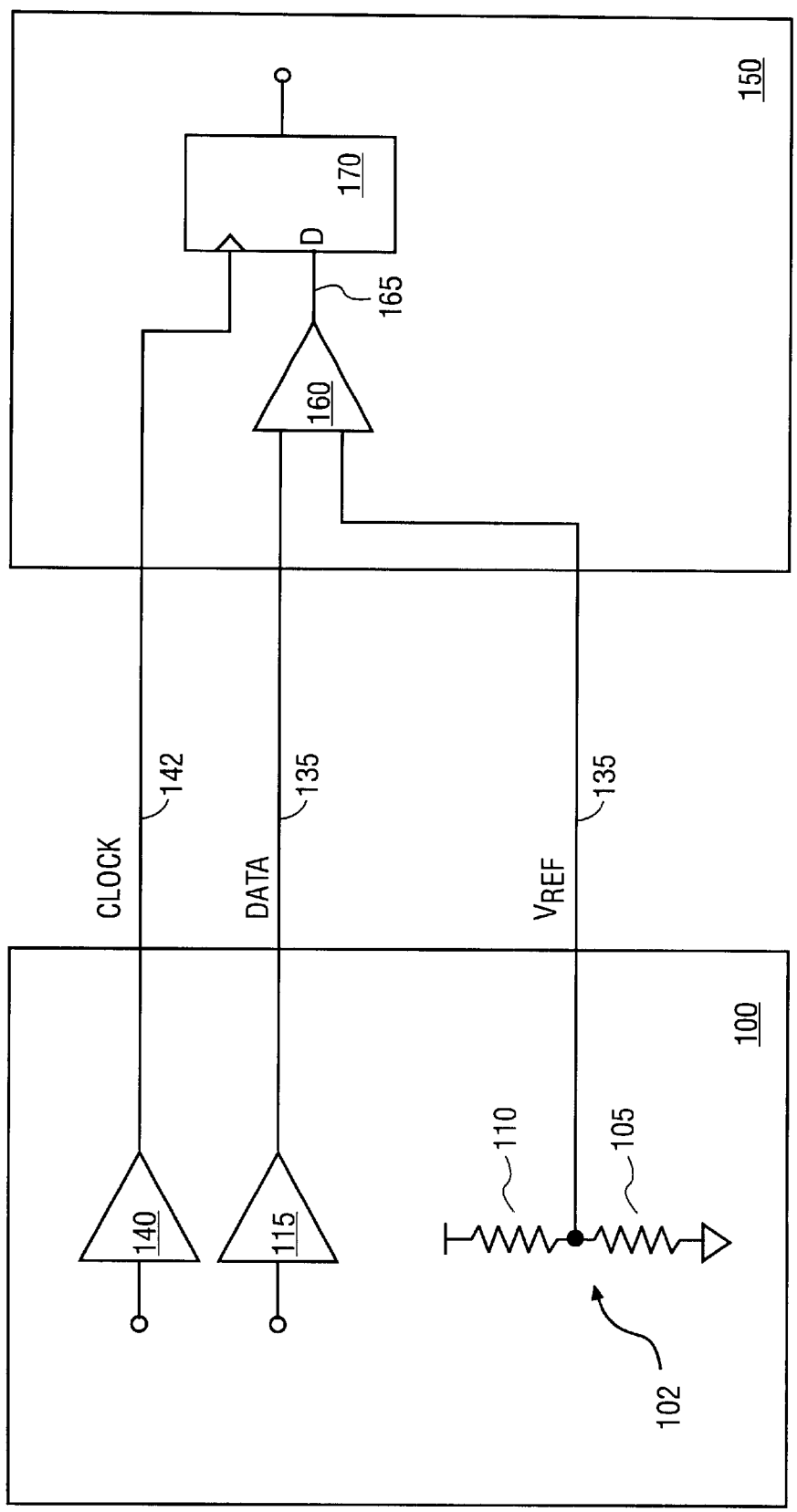
FIG. 1 illustrates one prior art technique for generating, transmitting, and using a pseudo-differential reference voltage.
Figure 2D:
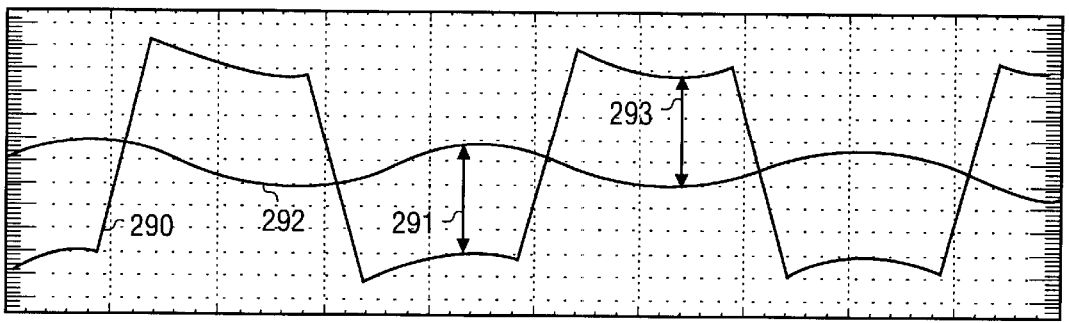

FIG. 2D illustrates an ideal voltage reference in the case where there is correlated noise in both the data signal 290 and the reference voltage 292. In reality, the noise would not be as perfectly correlated as shown; however, a prior art system may come close to this ideal performance by transmitting a separate reference voltage as shown in and discussed with respect to FIG. 1. In the case shown in FIG. 2D, the same high and low noise margins 291 and 293 are obtained as in the ideal case of FIG. 2B because any noise in the data signal is also directly reflected in the reference voltage and therefore may be canceled.

Figure 2E:
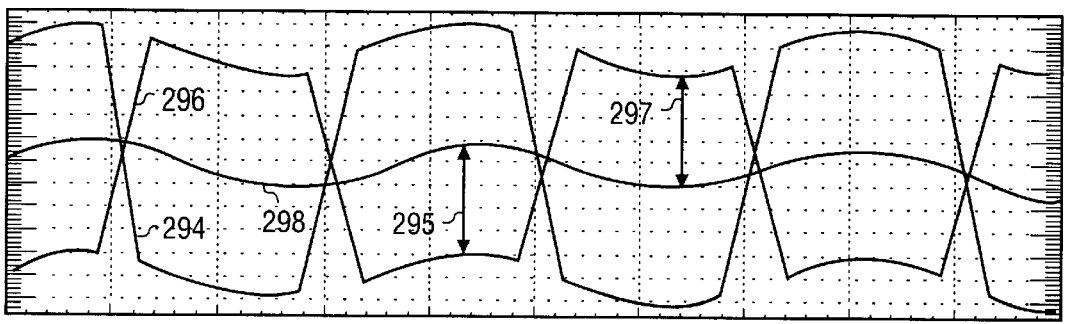

FIG. 2E illustrates complementary signals 294 and 296 and a reference voltage 298 generated therefrom. Assuming that the data signal is generated near the strobe signals, then the data signal behaves similarly to the strobes. Thus, the low noise margin 295 and the high noise margin 297 for the reference voltage generated using the complementary signals approaches that of the ideal case. Of course, phase shift introduced by the reference voltage generator as well as any dissimilarity between the data and complementary signal paths and circuitries reduce the noise margin. Nonetheless, FIG. 2E illustrates that a reference voltage generated by the currently disclosed techniques may be an effective tool for improving noise margins when transmitting signals.

Figure 3:
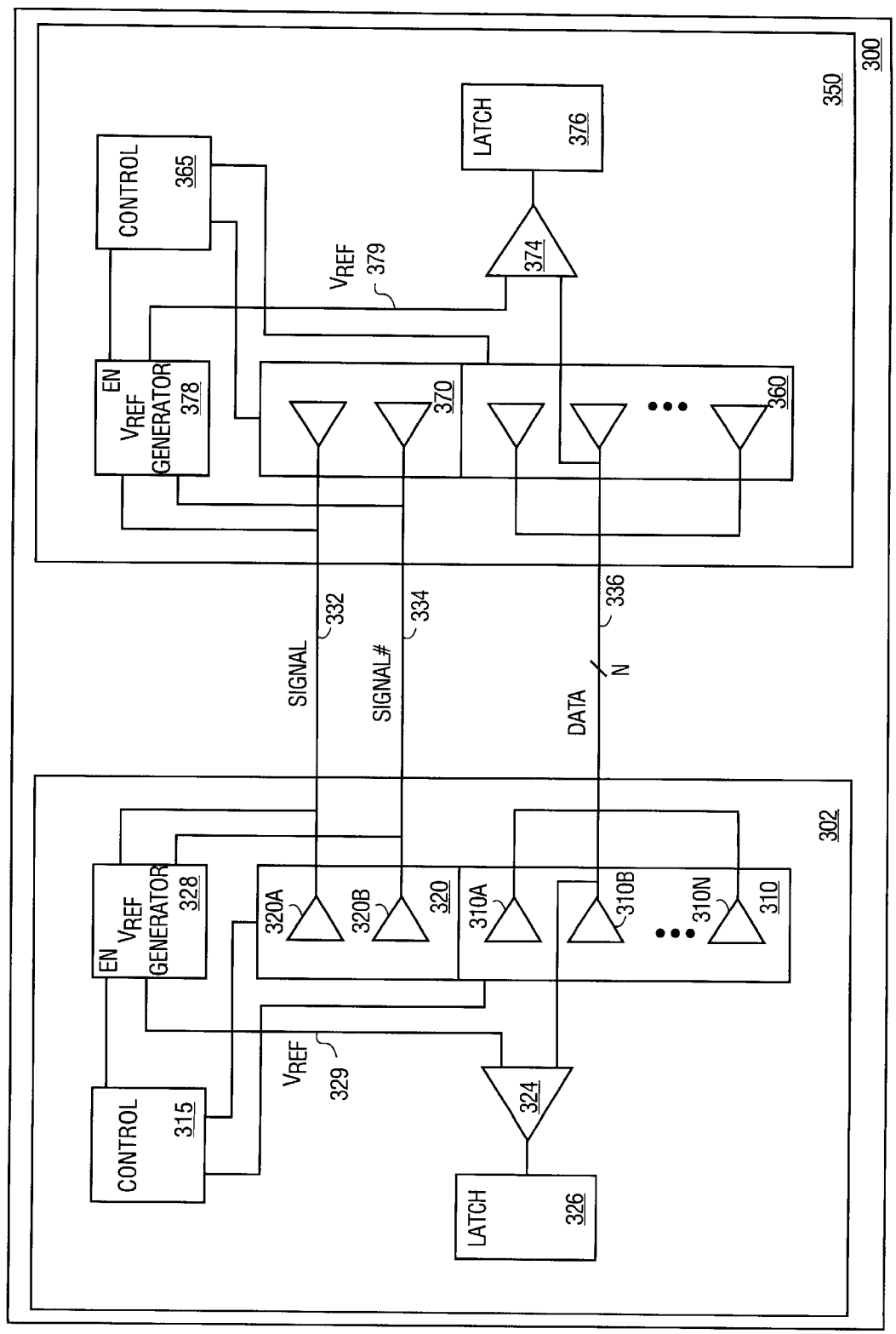
FIG. 3 illustrates an embodiment of bi-directional driver and receiver circuits having reference voltage generators that may be selectably enabled.

FIG. 3 illustrates an embodiment having several additional features. In this embodiment, bi-directional (half-duplex) signaling is used. Therefore, the reference voltage generators may be selectably enabled to save power since only one component drives a particular signal line at a time. That is, the reference voltage generators on one component may be disabled while that component drives the signal lines and/or enabled at times when the complementary signals and data are being received from another component. Additionally, FIG. 3 illustrates that the complementary signals may be provided to cancel noise for an entire set of signals, such as a data bus.

Furthermore, FIG. 3 illustrates that a variety of signals may be used to generate the reference voltage as long as the signal (SIGNAL) and its complement (SIGNAL#) are available. Complementary signals routed similarly to the data signals or otherwise having similar noise characteristics may be used. It may be advantageous, however, to utilize signal drivers positioned close to the signal driver driving the data signal in which noise is being canceled so that the noise in the complementary signals closely mimics that in the data signal. Additionally, it may be advantageous to arrange signal routing of the complementary signals in a similar manner to the routing of the data signal.

In FIG. 3, a first component 302 includes both driving and receiving circuitry. A first set of drivers 310 drives a data bus 336. The data bus 336 is N bits wide and, accordingly, the set of drivers 310 includes drivers 310A, 310B to 310N. N may be any convenient number, however, in one embodiment a pair of complementary signals is used with sixteen data signals. Another set of drivers 320, including driver 320A and 320B drive the complementary signals SIGNAL and SIGNAL# respectively on signal lines 332 and 334. SIGNAL and SIGNAL# are typically clocks (or strobe) signals since complementary versions of clock or strobe signals are often available.

Component 302 also includes a reference voltage generator 328 coupled to receive SIGNAL and SIGNAL# and to generate therefrom a reference voltage signal on a signal line 329. A sense amp 324 receives the reference voltage and the data bits from the data bus 336. Although not shown, the sense amp 324 is replicated N times so there is one sense amp for each data signal on the data bus 336. The sense amp 324 cancels a noise component from the data signals. A latch 326 then receives data from the sense amp 324 for use by other portions of the component 302.

A control circuit 315 is coupled to control functioning of the input and output (I/O) circuits of the component 302. The control circuit is therefore coupled to the drivers 310 and 320 to properly control and synchronize their operation. The control circuit 315 generates one or more enable signals that are provided at an enable input of the voltage generator circuit 328. The control circuit 315 thereby disables the reference voltage generator 328 when the component 302 drives the SIGNAL and SIGNAL# signals in order to save power. When the component 302 receives SIGNAL and SIGNAL#, the reference voltage generator 328 is enabled to cancel noise in the concurrently received data signals. Alternatively, the control circuit 315 may enable the reference voltage generator 328 at times when the component 302 is not driving SIGNAL and SIGNAL#.

Similarly, the component 350 contains a set of drivers 360 for the data bus 336 and a set of drivers 370 for SIGNAL and SIGNAL#. A reference voltage generator 378 is coupled to receive SIGNAL and SIGNAL# and to generate therefrom a reference voltage on a signal line 379. A sense amp 374 (again replicated for the entire data bus 336) is coupled to receive the reference voltage signal and pass a data bit from the data bus 336 to a latch 376 for use by the component 350. The sense amp cancels a common mode noise component from data signals received from the component 302 based on the complementary signals received from the component 302. Also, a control circuit 365 controls the drivers 360 and the drivers 370 as well as disabling the reference voltage generator 378 when the drivers 370 are enabled to drive SIGNAL and SIGNAL#.

Notably, components 302 and 350 may be single integrated circuits or other components. Components 302 and 350 may alternatively be portions of integrated circuits or other components, and/or may be individual components of a module 300 or other larger components. Regardless of logic partitioning and integration choices, the presently disclosed techniques may be employed to reduce noise and improve signal transmission.

Figure 4A:
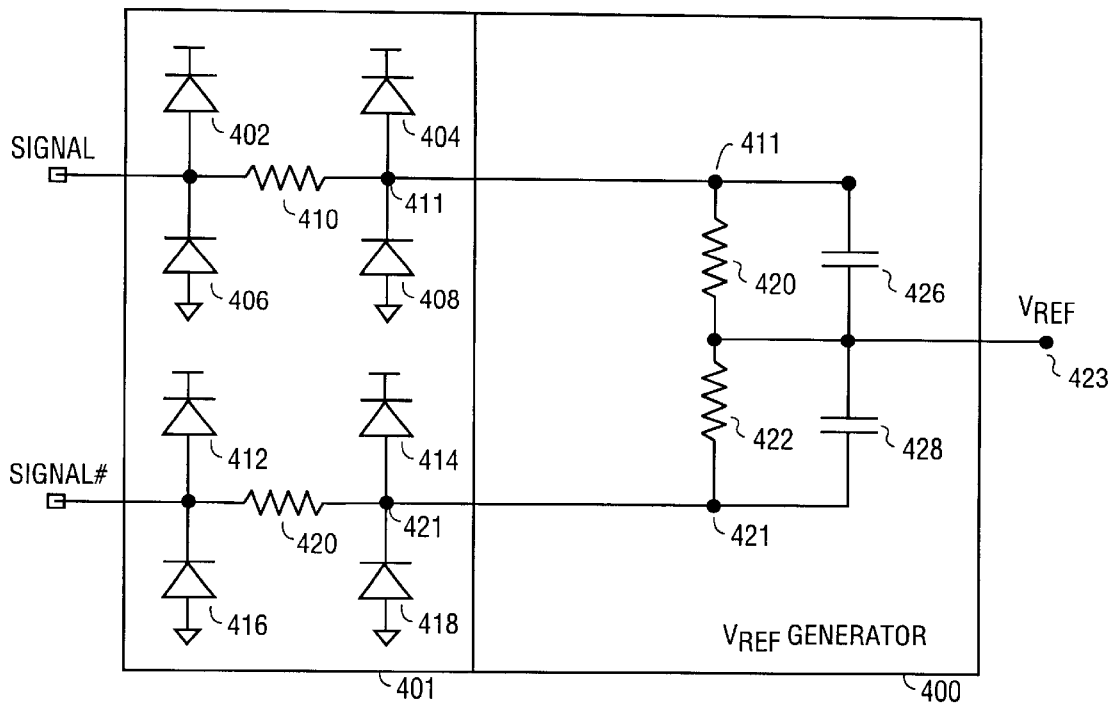
FIGS. 4A–4E illustrate several embodiments of a reference voltage circuit.

FIGS. 4A–4E illustrate a number of exemplary embodiments of reference voltage generators. In the embodiment of FIG. 4A, both an input electrostatic discharge (ESD) protection circuit 401 and the reference voltage generator 400 are shown. Alternative known or otherwise available ESD protection circuitry may be used. Additionally, more complex input circuitry may be inserted before the reference voltage generator 400; however FIG. 4A illustrates that the complementary SIGNAL and SIGNAL# may be directly routed to the reference voltage generator from very close to the input to a component such as an integrated circuit.

In FIG. 4A, the ESD protection circuit 401 includes a diode 402 coupled between the SIGNAL input node and the supply voltage (Vcc). A diode 406 is coupled between the SIGNAL input node and ground. Such diodes are typically integrated into the output driver circuit layout for bi-directional pins. A resistor 410 couples the input node to a node 411. A diode 404 couples node 41 1 to Vcc, and a diode 408 couples the node 411 to ground. Similarly, the SIGNAL# input node is coupled by a diode 412 to Vcc and by a diode 416 to ground. A resistor 420 couples the SIGNAL# input node to a node 421. The node 421 is coupled to Vcc by a diode 414 and to ground by a diode 418.

The voltage reference generator 400 includes resistive and capacitive portions to respectively couple AC and DC components of (common mode) noise to the reference voltage node 423. A resistor 420 is coupled between node 411 and node 423. A resistor 422 is coupled between node 423 and node 421. When equivalent resistors are used, resistors 422 and 420 form a resistive divider that generates a reference voltage (Vref) of approximately one-half of the sum of complementary signals SIGNAL and SIGNAL#. A capacitor 426 is coupled between node 411 and node 423, and a capacitor 428 is coupled between node 421 and node 423.

Figure 4B:
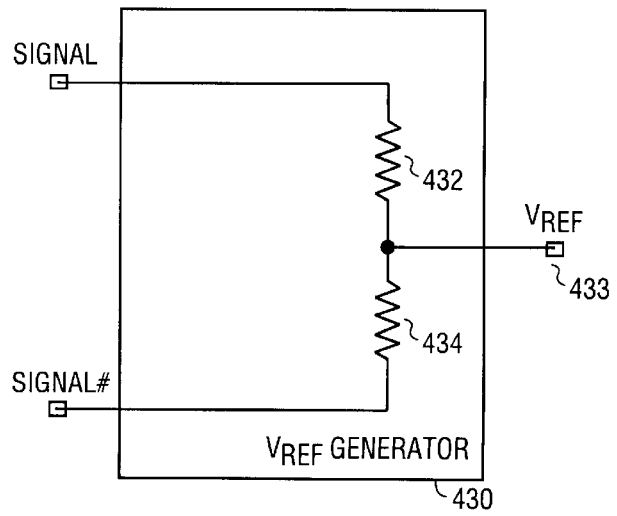

FIG. 4B illustrates another embodiment of a reference voltage generator 430. This reference voltage generator 430 includes a resistive divider between the SIGNAL and SIGNAL# input nodes. As referred to hereafter, the SIGNAL and SIGNAL# input nodes may be after any ESD protection or other input circuitry. A resistor 432 couples the SIGNAL node to a voltage reference node 433. A resistor 434 couples the SIGNAL# node to the voltage reference node 433. In this embodiment, no capacitive coupling is included. This implementation may be appropriate where sufficient room may not be available for capacitors or where a low enough resistance is used so that an unacceptable phase shift is not introduced. The low resistance causes a leakage current. Therefore, the leakage current and phase offset determined by the resistance and any parasitic capacitance also need to be understood and balanced.

Figure 4C:
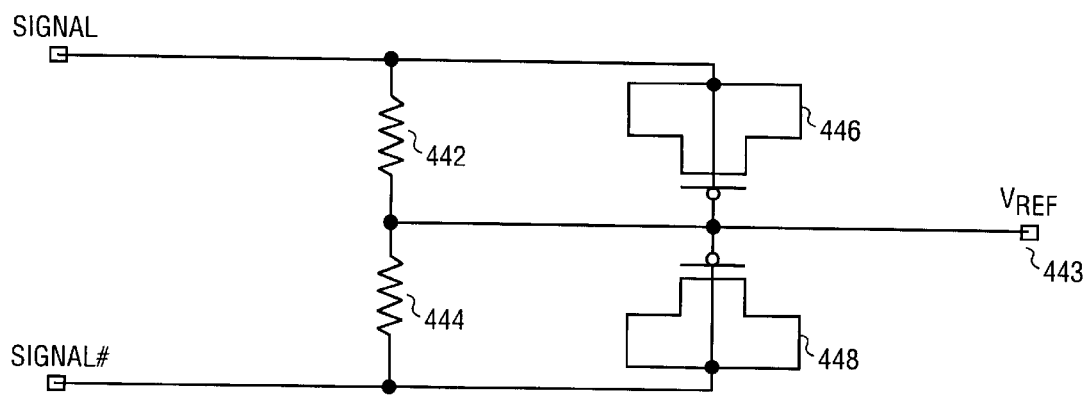

FIG. 4C illustrates one embodiment utilizing gate capacitance of transistors to form the capacitors for the reference voltage circuit 440. The reference voltage circuit 440 has a first transistor 446 capacitively coupling the SIGNAL input node to the reference voltage node 443 and a second transistor 448 capacitively coupling the SIGNAL# input node to the reference voltage node 443. The transistor 446 is connected with its source, drain, and body terminals connected together to the SIGNAL input node. The gate of the transistor 446 is connected to the reference voltage node 443. The transistor 448 also has its source, drain, and body terminals connected together and these terminals are connected to the SIGNAL# input node. The gate of the transistor 448 is connected to the reference voltage node 443. Alternative capacitors such as polysilicon or other known or otherwise available on-chip, off-chip, or other capacitors may be used in other embodiments.

A resistor 442 couples the SIGNAL input node to a reference voltage node 443. A resistor 444 couples the SIGNAL# input node to the voltage reference node 443. In some embodiments, these resistors may be poly resistors formed in the polysilicon layer of an integrated circuit since the resistance of polysilicon resistors may be more controllable than other types of resistive devices. In other embodiments, other known or otherwise available on-chip, off-chip, or other resistive devices may be used. For example, N-well resistors, polysilicon resistors, or a combination of NMOS and PMOS devices may be used to form resistances. The ratio of the resistances is more important than the absolute resistance values for generating a proper reference voltage level in embodiments using a voltage divider in this manner.

Figure 4D:
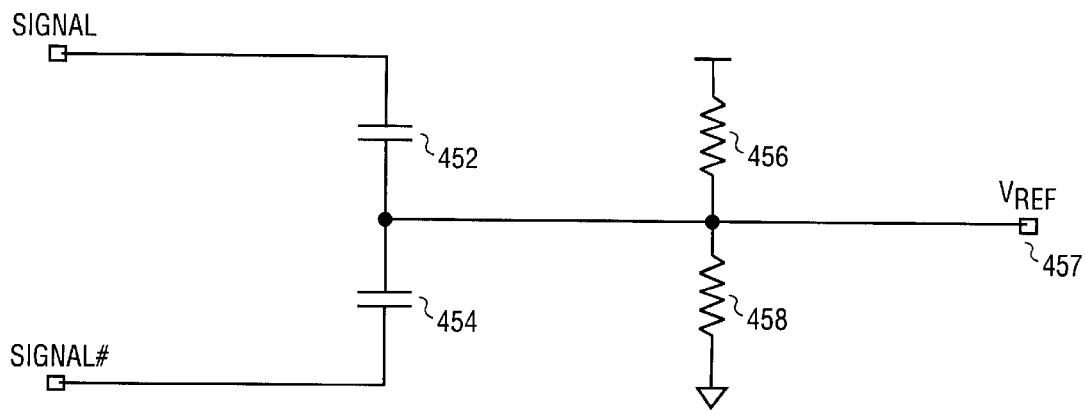

FIG. 4D illustrates an embodiment of a reference voltage generator 450 which primarily couples an AC component of noise from the complementary signals to a voltage reference node 457. The reference voltage generator 450 has a capacitor 452 coupling the SIGNAL input node to the reference voltage node 457. A capacitor 454 couples the SIGNAL# input node to the reference voltage node 457. A resistive divider formed by a resistor 456 and a resistor 458 coupled between the supply voltage and ground voltage or Vss biases the voltage reference node 457. In some embodiments, the resistance values of the resistor 456 and the resistor 458 are approximately equal so that the reference voltage node 457 is biased to approximately one-half the supply voltage value.

Figure 4E:
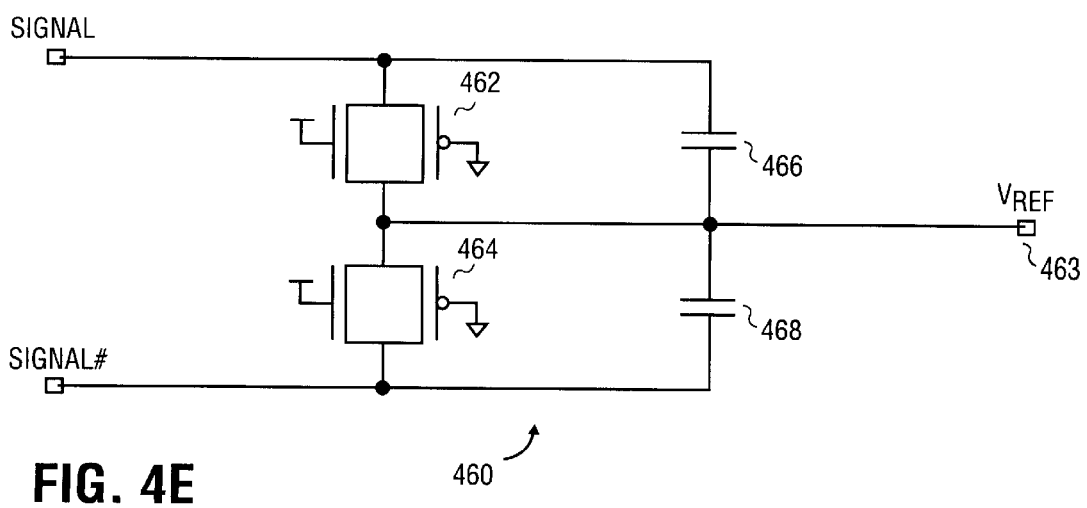

FIG. 4E illustrates an embodiment of a reference voltage generator 460 that utilizes pass gates as resistive devices. The voltage reference generator 460 includes an enabled pass gate 462 coupling the SIGNAL input node to a reference voltage node 463. A pass gate 464 couples the SIGNAL# input node to the reference voltage node 463. Two transistors, one N channel transistor and one P channel transistor may form the pass transistors. The gate input of the N channel transistor is tied to Vcc and the gate input of the P channel transistor is coupled to Vss or the ground voltage. The source and gate of the N transistor are respectively coupled to the source and gate of the P channel transistor. A capacitor 466 couples the SIGNAL input node to the reference voltage node 463, and a capacitor 468 couples the SIGNAL# input node to the reference voltage node 463.

The embodiments of reference voltage generators shown in FIGS. 4A–4E are continuously enabled. In contrast, the reference voltage generators shown in FIGS. 5A–5C include enable inputs so that these circuits may be selectably enabled. One of skill in the art will recognize that the circuits of FIGS. 4A–4E may also accordingly be modified so that they may be selectably enabled.

Figure 5A:
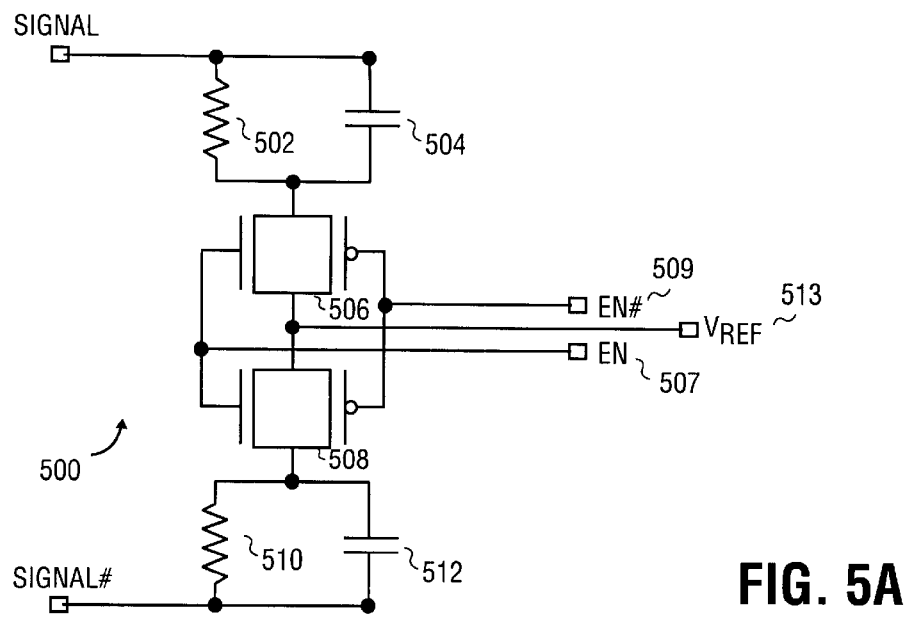
FIGS. 5A–5C illustrate several embodiments of a reference voltage circuit with enable inputs that may be used in embodiments that perform selectable enabling of the reference voltage circuit.

FIG. 5A illustrates a reference voltage generator 500 with pass transistors for selectably enabling the reference voltage generator in series with resistive and capacitive elements. A pass gate 506 is connected in series with the parallel combination of a resistor 502 and a capacitor 504 to couple the SIGNAL input node to a voltage reference node 513. Similarly a pass gate 508 is connected in series with the parallel combination of a resistor 510 and a capacitor 512 to couple the SIGNAL# input node to the voltage reference node 513. The gate inputs of the N channel transistors of the pass gates are connected to an enable signal (EN) provided on a signal line 507. The gate inputs of the P channel transistors of the pass gates are connected to a complementary enable signal (EN#) provided on a signal line 509.

Figure 5B:
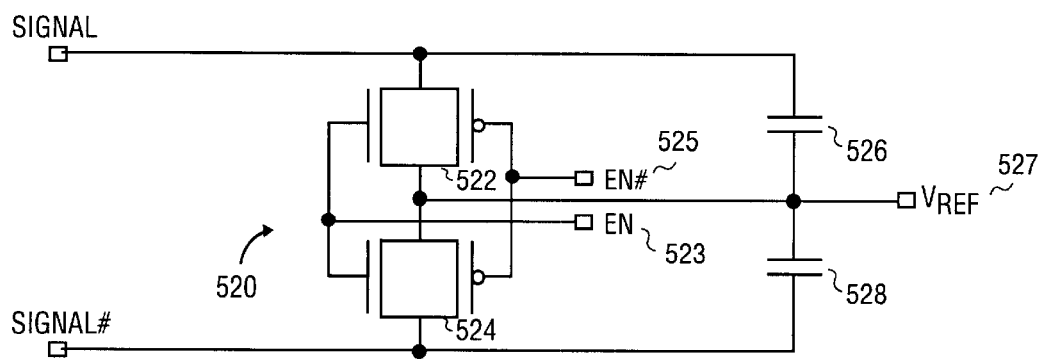

FIG. 5B illustrates an embodiment of a reference voltage generator 520 having selectably enabled pass gates as resistive elements. Accordingly, the pass gates have a relatively high impedance, even when enabled. A pass gate 522 couples the SIGNAL input node to a voltage reference voltage node 527. A pass gate 524 couples the SIGNAL# input node to the reference voltage node 527. A capacitor 526 couples the SIGNAL input node to the reference voltage node 527, and a capacitor 528 couples the SIGNAL# input node to the reference voltage node 527. The gate inputs of the N channel transistors of the pass gates are connected to an enable signal (EN) provided on a signal line 523. The gate inputs of the P channel transistors of the pass gates are connected to a complementary enable signal (EN#) provided on a signal line 525. This embodiment disables only the resistive (DC) path when then EN and EN# signals are deasserted (respectively at logic low and high values).

Figure 5C:
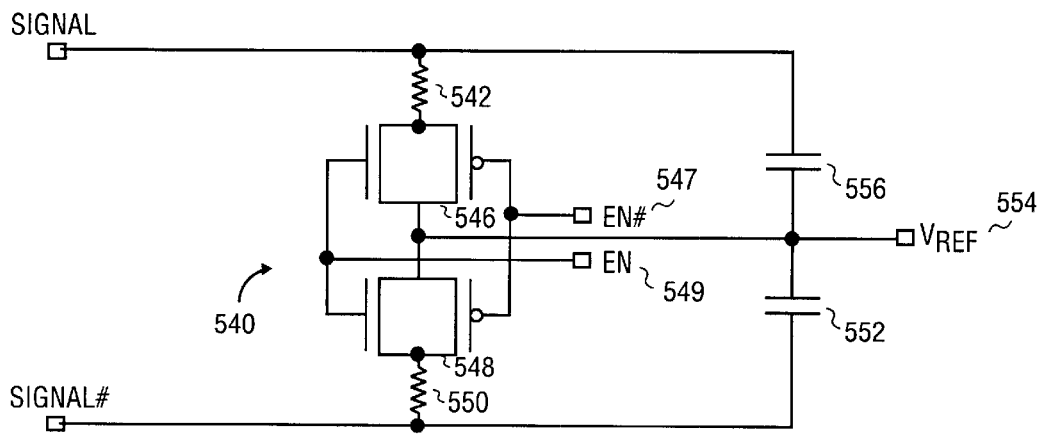

FIG. 5C illustrates an embodiment of a reference voltage generator 540 having pass gates in series with resistive elements. This embodiment also only disables the DC path. A pass transistor 546 is connected in series with a resistor 542 to couple the SIGNAL input node to a reference voltage node 554. A pass transistor 548 is connected in series with a resistor 550 to couple the SIGNAL# input node to the reference voltage node 554. A capacitor 556 couples the SIGNAL input node to the reference voltage node 554, and a capacitor 552 couples the SIGNAL# input node to the reference voltage node 554. The gate inputs of the N channel transistors of the pass gates are connected to an enable signal (EN) provided on a signal line 549. The gate inputs of the P channel transistors of the pass gates are connected to a complementary enable signal (EN#) provided on a signal line 547.

In the various embodiments shown, it may be advantageous to use large resistance values to limit the amount of power dissipated through the resistive divider. The impedance of the resistive elements is typically much greater than the impedance of the signal line to avoid distortion of the received complementary signals. On the other hand, a large resistance may cause a relatively large response time because the high resistance introduces a phase offset between the data signals and the generated reference voltage. The larger the phase offset, the less this scheme can reject high frequency noise.

The actual value of the resistances typically is not crucial in generating an appropriate reference voltage level since two resistors may be used in a voltage divider arrangement, and in this case the ratio of the two resistors that sets the proper reference voltage level. The actual resistance values do affect leakage current and the degree of phase shift. In embodiments where the two resistors are fabricated on a common semiconductor substrate, resistances typically vary due to fabrication and operating conditions in a substantially similar manner. Therefore the bias level produced at the voltage divider node remains approximately constant when a voltage divider arrangement is used.

The capacitive elements improve the response time by reducing the phase offset introduced by the high impedance resistive divider; however, such capacitors may consume a significant amount of area, and the total space consumption may need to be balanced with the performance desired. Therefore, in embodiments where capacitors are not used, it may be advantageous to use a lower resistance value to limit the skew introduced by the resistance. Again, the absolute value of the capacitors may not be crucial in embodiments where the capacitors are arranged in a capacitive divider fashion and/or fabricated on the same semiconductor substrate.

Thus, a method and apparatus for generating a reference voltage signal derived from complementary signals is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
 a driver circuit coupled to drive two complementary signals and a third signal, said driver circuit further comprising
  a first strobe generator coupled to generate a strobe signal which is one of the two complementary signals;
  a second strobe generator coupled to generate a complementary strobe signal which is the other of the two complementary signals; and a signal line driver coupled to generate the third signal; and a receiver circuit coupled to receive said two complementary signals and said third signal, said receiver circuit to generate a reference voltage from said two complementary signals, said receiver circuit to use said reference voltage to remove a noise component in said third signal.

2. The apparatus of claim 3 wherein the receiver circuit comprises:

a reference voltage generator coupled to receive the strobe signal and the complementary strobe signal and to derive therefrom the reference voltage;

an input circuit coupled to receive the reference voltage and the data signal and to reduce common mode noise transmitted with said third signal using the reference voltage.

3. The apparatus of claim 2, wherein the input circuit is a differential sense amplifier with a high common mode rejection ratio.

4. The apparatus of claim 2 wherein said receiver circuit further comprises a latch coupled to said strobe signal and said complementary strobe signal, wherein both the strobe signal and the complementary strobe signal are used to latch the third signal.

5. The apparatus of claim 2 wherein said first strobe generator generates the strobe signal on a first strobe signal line and said second strobe generator generates the complementary strobe signal on a second strobe signal line and wherein said receiver circuit further comprises:

a first receiver strobe generator coupled to generate a receiver strobe signal on the first strobe signal line; and a second receiver strobe generator coupled to generate a complementary receiver strobe signal on the second strobe signal line, wherein said reference voltage generator receives an enable signal which disables said reference voltage generator when said receiver circuit drives the receiver strobe signal and the complementary receiver strobe signal and which enables the reference voltage generator when said driver circuit drives the strobe signal and the complementary strobe signal.

6. The apparatus of claim 5 wherein the driver circuit further comprises:

a driver reference voltage generator coupled to generate a driver reference voltage from the receiver strobe signal and the complementary receiver strobe signal, the driver reference voltage generator being enabled when the receiver drives the receiver strobe signal and the complementary receiver strobe signal; and a driver input circuit coupled to receive a data signal driven by the receiver circuit and to cancel noise in the data signal driven by the receiver circuit by subtracting the driver reference voltage.

7. The apparatus of claim 1 wherein the receiver circuit includes a reference voltage generator comprising:

a first resistive device having a first resistive device first terminal coupled to receive one of the two complementary signals and a first resistive device second terminal coupled to a reference voltage node at which the reference voltage is generated; and a second resistive device having a second resistive device first terminal coupled to receive the other of the two complementary signals and a second resistive device second terminal coupled to the reference voltage node.

8. The apparatus of claim 7 wherein the reference voltage generator further comprises:

a first capacitive device having a first capacitive device first terminal coupled to receive one of the two complementary signals and a first capacitive device second terminal coupled to the reference voltage node; and a second capacitive device having a second capacitive device first terminal coupled to receive the other of the two complementary signals and a second capacitive device second terminal coupled to the reference voltage node.

9. The apparatus of claim 1 wherein the receiver circuit comprises:

means for coupling the two complementary signals to a reference voltage node at which the reference voltage is generated;

an input circuit coupled to receive a data signal from the driver circuit and to remove a portion of noise from the data signal indicated by the reference voltage.

10. The apparatus of claim 4 wherein the reference voltage generator comprises:

a first capacitive device having a first capacitive device first terminal coupled to receive the strobe signal and a first capacitive device second terminal coupled to a reference voltage node at which the reference voltage is generated; and a second capacitive device having a second capacitive device first terminal coupled to receive the complementary strobe signal and a second capacitive device second terminal coupled to the reference voltage node.

11. The apparatus of claim 1 wherein said driver circuit is located on a first integrated circuit and said receiver circuit is located on a second integrated circuit.

12. The apparatus of claim 1 wherein the data signal is generated in conjunction with the two complementary signals and wherein the receiver circuit latches the data signal using at least one of the two complementary signals.

13. An apparatus comprising:

a reference voltage generator coupled to receive a first signal and a second signal which is complementary to the first signal, said reference voltage generator to generate a reference voltage reflecting a noise component from the first signal and the second signal, said reference voltage generator further comprising a first resistive device having a first resistive device first terminal coupled to receive the first signal and a first resistive device second terminal coupled to a reference voltage node at which the reference voltage is generated;

a second resistive device having a second resistive device first terminal coupled to receive the second signal and a second resistive device second terminal coupled to the reference voltage node;

a first capacitive device having a first capacitive device first terminal coupled to receive the first signal and a first capacitive device second terminal coupled to the reference voltage node; and a second capacitive device having a second capacitive device first terminal coupled to receive the second signal and a second capacitive device second terminal coupled to the reference voltage node; and an input circuit coupled to said reference voltage generator, said input circuit to remove noise from a received data signal using the reference voltage.

14. The apparatus of claim 13 wherein the reference voltage generator comprises:

means for coupling a component of the first signal and the second signal to a reference voltage node at which the reference voltage is generated.

15. A method comprising:

generating a strobe signal as a first signal;

generating a second signal that is a complement of the first signal;

generating a third signal;

receiving said first signal and said second signal at a receiver;

deriving a reference voltage from the first signal and the second signal, said deriving further comprising applying the strobe signal and the inverted strobe signal to opposite ends of a resistive divider having a divider node at which the reference voltage is developed; and applying the strobe signal and the complementary strobe signal to opposite ends of a capacitive divider having the divider node at its center; and reducing noise in said third signal using said reference voltage.

16. The method of claim 15 wherein reducing noise comprises:

applying the reference voltage and the third signal to a sense amplifier with a high common mode rejection ratio.

17. The method of claim 15 further comprising:

disabling a reference voltage generator that derives the reference signal from the first signal and the second signal when an integrated circuit including the reference voltage generator drives a first signal line and a second signal line on which the first signal and second signal respectively are received by the integrated circuit.

18. The method of claim 15 wherein generating said second signal comprises generating an inverted strobe signal as said second signal.

19. The method of claim 18 wherein generating said third signal comprises generating a data signal as said third signal, said data signal being generated in synchronization with said strobe signal and said inverted strobe signal.

* * * * *